United States Patent
Zheng

(10) Patent No.: US 10,203,536 B2
(45) Date of Patent: Feb. 12, 2019

(54) PHOTO-TUNABLE LIQUID CRYSTAL COMPOSITION AND METHODS FOR THEIR FABRICATION AND USE

(71) Applicant: EAST CHINA UNIVERSITY OF SCIENCE AND TECHNOLOGY, Shanghai (CN)

(72) Inventor: Zhigang Zheng, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 84 days.

(21) Appl. No.: 15/316,429

(22) PCT Filed: Jun. 5, 2014

(86) PCT No.: PCT/CN2014/079277
§ 371 (c)(1),
(2) Date: Dec. 5, 2016

(87) PCT Pub. No.: WO2015/184624
PCT Pub. Date: Dec. 10, 2015

(65) Prior Publication Data
US 2017/0153490 A1    Jun. 1, 2017

(51) Int. Cl.
*C09K 19/00* (2006.01)
*G02F 1/1333* (2006.01)
(Continued)

(52) U.S. Cl.
CPC ........ *G02F 1/133362* (2013.01); *C09B 31/12* (2013.01); *C09K 11/06* (2013.01);
(Continued)

(58) Field of Classification Search
CPC ........................................... G03F 1/13
See application file for complete search history.

(56) References Cited

U.S. PATENT DOCUMENTS 5,204,018 A * 4/1993 Kelly ................. C07C 13/28
252/299.5
7,623,214 B2    11/2009 Coles et al.
(Continued)

FOREIGN PATENT DOCUMENTS

CN    1620688 A    5/2005
CN    1934222 A    3/2007
(Continued)

OTHER PUBLICATIONS

Chanishvili et al., Phototunable lasing in dye-doped cholesteric liquid crystals, Applied Physics Letters (Dec. 29, 2003), 83(26) pp. 5353-5355.
(Continued)

*Primary Examiner* — Chanceity N Robinson

(57) ABSTRACT

A photo-tunable liquid crystal composition may include a polymer matrix and a liquid crystal mixture dispersed within the polymer matrix. The liquid crystal mixture may include at least one achiral nematic liquid crystal material, at least sine photo-active chiral dopant, at least one photo-inactive chiral dopant, and at least one emissive dye. The composition may be fabricated in the form of an emulsion, a wet film, or a dry film. The dry film may be used in a photo-tunable liquid crystal film laser. The output wavelength of the photo-tunable liquid crystal film laser may be tuned by exposing the dry film to illumination having at least one wavelength at one or more transition wavelengths.

31 Claims, 7 Drawing Sheets

(51) Int. Cl.
- *C09K 19/52* (2006.01)
- *C09K 19/54* (2006.01)
- *C09K 19/58* (2006.01)
- *C09K 19/60* (2006.01)
- *G02F 1/137* (2006.01)
- *C09B 31/12* (2006.01)
- *C09K 11/06* (2006.01)
- *G02F 1/1334* (2006.01)

(52) U.S. Cl.
CPC .............. *C09K 19/52* (2013.01); *C09K 19/54* (2013.01); *C09K 19/544* (2013.01); *C09K 19/586* (2013.01); *C09K 19/60* (2013.01); *G02F 1/1334* (2013.01); *G02F 1/13725* (2013.01); *G02F 1/13762* (2013.01); *C09K 2019/546* (2013.01); *C09K 2211/1007* (2013.01); *C09K 2211/1088* (2013.01); *G02F 2202/046* (2013.01)

(56) References Cited

U.S. PATENT DOCUMENTS

| | | | |
|---|---|---|---|
| 2005/0008057 A1* | 1/2005 | Leyrer | C08F 291/00 372/53 |
| 2006/0027784 A1* | 2/2006 | Francis | C09K 19/586 252/299.63 |
| 2011/0216271 A1* | 9/2011 | Suzuki | G02F 1/13362 349/71 |
| 2013/0334461 A1 | 12/2013 | Kubota et al. | |

FOREIGN PATENT DOCUMENTS

| | | |
|---|---|---|
| CN | 102443402 A | 5/2012 |
| CN | 103275736 A | 9/2013 |
| WO | 03001516 A1 | 1/2003 |
| WO | 2005019379 A1 | 3/2005 |

OTHER PUBLICATIONS

Chilaya et al., Different Approaches of Employing Cholesteric Liquid Crystals in Dye Lasers, Materials Sciences and Applications (2011), (2) pp. 116-129.

Gardiner et al., Paintable band-edge liquid crystal lasers, Optics Express (Jan. 10, 2011), 19(3) pp. 2432-2439.

Gardiner et al., Printed photonic arrays from self-organized chiral nematic liquid crystals, The Royal Society of Chemistry (2012), (8) pp. 9977-9980.

Hands et al., Band-edge and random lasing in paintable liquid crystal emulsions (2011), Applied Physics Letters, (98) pp. 141102-1-141102-3.

International Search Report and Written Opinion for International Application No. PCT/CN2014/079277 dated Mar. 3, 2015, pp. 9.

Li et al., Reversible Photoswitchable Axially Chiral Dopants with High Helical Twisting Power, American Chemical Society (Oct. 10, 2007), 129(43) pp. 12908-12909.

Lin et al., Cholesteric liquid crystal laser with wide tuning capability, Applied Physics Letters (2005), (86) pp. 161120-1-161120-3.

\* cited by examiner

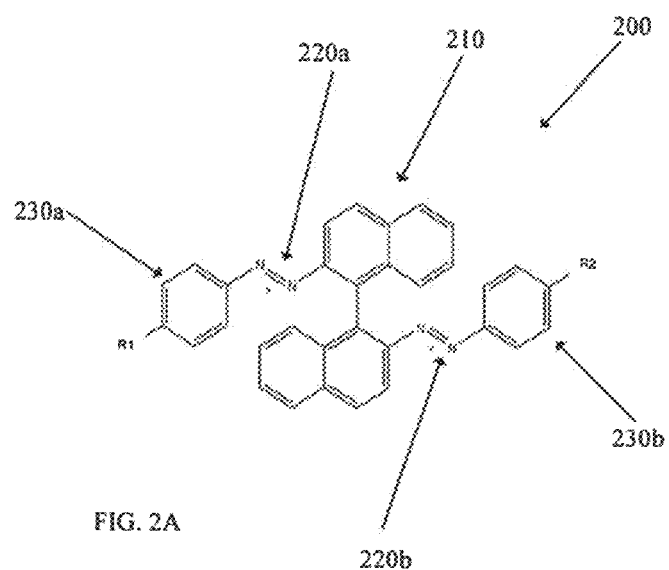
FIG. 2A
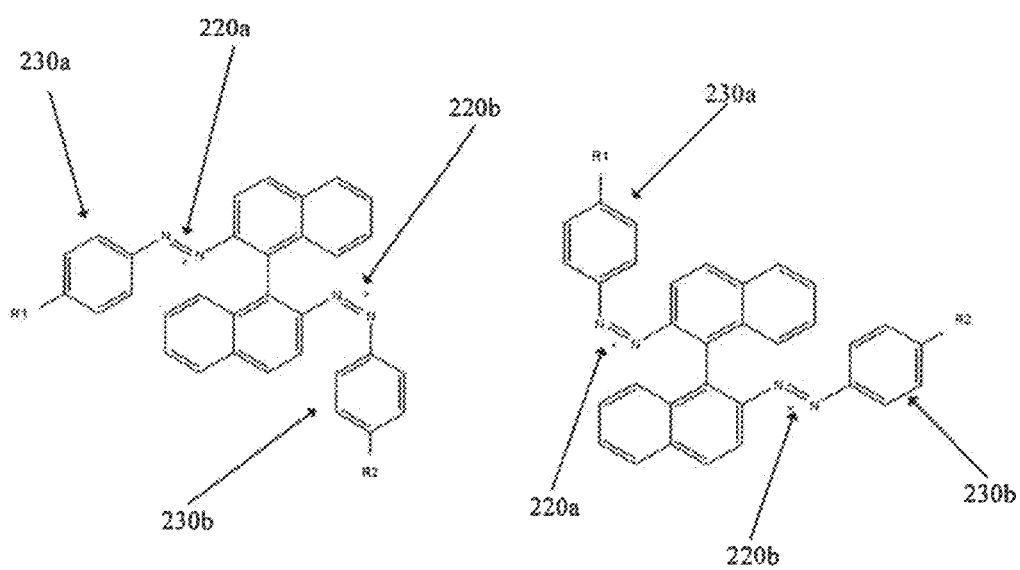
FIG. 2B
FIG. 2C

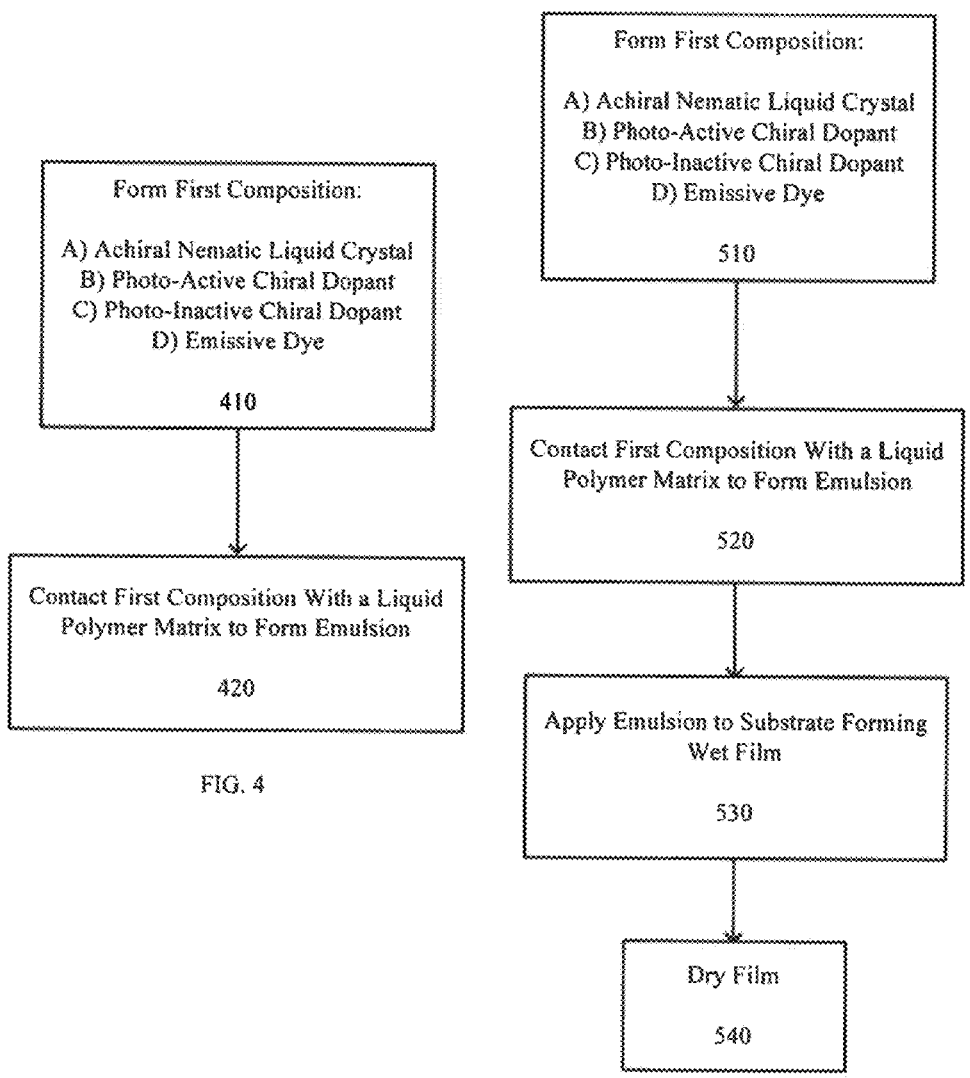

PHOTO-TUNABLE LIQUID CRYSTAL COMPOSITION AND METHODS FOR THEIR FABRICATION AND USE

CROSS-REFERENCE TO RELATED APPLICATION

This application is a U.S. national stage filing under 35 U.S.C. § 371 of International Application No. PCT/CN2014/079277 filed on Jun. 5, 2014 entitled "PHOTO-TUNABLE LIQUID CRYSTAL COMPOSITION AND METHODS FOR THEIR FABRICATION AND USE," which is incorporated herein by reference in its entirety.

BACKGROUND

Recent works of paintable and printed liquid crystal laser arrays demonstrate that such lasers may be readily fabricated using printed film technology. Such films may exhibit good photonic band edge characteristic and demonstrate a feasible approach for readily producing compact optical devices. In order to broaden the usefulness of such devices, output tuning of the wavelength emitted by such micro lasers may be of great importance. Consequently, the ability to tune the optical output of emulsion-based micro liquid crystal lasers may be desirable.

In typical cholesteric phases of liquid crystals (LCs), molecules self-organized to form a periodic structure through Van-de-Waals interaction. This structure, when doped with one or more laser dyes, may be suitable for low-threshold photonic band-edge lasing across the near-infrared to the ultraviolet wavebands. Due to the liquid-like and anisotropic characteristic of LCs, such lasers may be able to respond to external stimuli or fields, including stress, thermal radiation, electric fields, and photo-irradiation.

The tunability of common LC lasers may be realized by applying an electric field across the sample (electric-field-tuning) or by heating the material. Electric fields may destroy the periodic standing helical arrangement of LCs in the film, and may result in the disappearance of lasing. Heat-tuning may require complex equipment and the heating process may take a significant amount of time. Thus, alternative methods to tune the optical characteristics of such thin film liquid crystal lasers that avoid such pitfalls may prove useful.

SUMMARY

In an embodiment, a photo-tunable liquid crystal composition may include a polymer matrix and a liquid crystal mixture dispersed within the polymer matrix, in which the liquid crystal mixture is composed of at least one achiral nematic liquid crystal material, at least one photo-active chiral dopant, at least one photo-inactive chiral dopant, and at least one emissive dye.

In an embodiment, a photo-tunable liquid crystal laser may include a photo-tunable liquid crystal laser film composed of an emulsion polymer matrix, and a liquid crystal mixture dispersed within the polymer matrix, in which the liquid crystal mixture is composed of at least one achiral nematic liquid crystal material, at least one photo-active chiral dopant, at least one photo-inactive chiral dopant, and at least one emissive dye. Additionally, the photo-tunable liquid crystal laser may include an optical pump configured to illuminate at least a portion of the photo-tunable liquid crystal laser film.

In an embodiment, a method of fabricating a photo-tunable liquid crystal film may include forming a first composition comprising at least one achiral nematic liquid crystal material, at least one photo-active chiral dopant, at least one photo-inactive chiral dopant, and at least one emissive dye, contacting the first composition with a liquid polymer matrix solution to form an emulsion, applying the emulsion to a substrate thereby forming a wet film, and drying the wet film thereby producing the photo-tunable liquid crystal film.

In an embodiment, a method of photo-tuning a liquid crystal film may include providing a photo-tunable liquid crystal film, the film composed of a polymer matrix, and a liquid crystal mixture dispersed within the polymer matrix, in which the liquid crystal mixture comprises at least one achiral nematic liquid crystal material, at least one photo-active chiral dopant, at least one photo-inactive chiral dopant, and at least one emissive dye, and illuminating at least a portion of the photo-tunable liquid crystal film with a source of radiation having at least one wavelength of about 200 nm to about 700 nm.

In an embodiment, a method of fabricating a photo-tunable liquid crystal composition may include forming a first composition composed of at least one achiral nematic liquid crystal material, at least one photo-active chiral dopant, at least one photo-inactive chiral dopant, and at least one emissive dye, and contacting the first composition with a liquid polymer matrix solution to form an emulsion.

BRIEF DESCRIPTION OF THE DRAWINGS

FIGS. 2A-2D depict stereo-isomers of a photo-active chiral dopant in accordance with some embodiments.

FIG. 4 is a flow diagram of a method of fabricating a photo-tunable liquid crystal composition in accordance with some embodiments.

FIG. 5 is a flow diagram of a method of fabricating a photo-tunable liquid crystal film in accordance with some embodiments.

DETAILED DESCRIPTION

Tunable laser devices may be used in a number of applications including holographic displays, laser microscopy, spectroscopy, photochemistry, and optical communication. A tunable laser device is a coherent light source having a selectable output wavelength. Such a single device may be used instead of multiple coherent sources or a low power broadband source. Typical tunable lasers may include excimer lasers, $CO_2$ lasers, and free electron lasers, among others. Many of these devices have large footprints, require significant power, and may be available only at a significant cost. Additionally, their optical components may be precisely aligned, thereby making them susceptible to physical shocks and jarring. A liquid crystal (LC) film laser may be less expensive, and the lasing element can be readily fabricated by simple printing techniques. As a result, liquid crystal (LC) film lasers may be significantly less expensive and more robust than their larger counterparts. A liquid crystal (LC) film laser with output tunability may combine the multi-functional utility of the tunable laser with the low-cost and robust platform of an LC film device.

Figure 1:
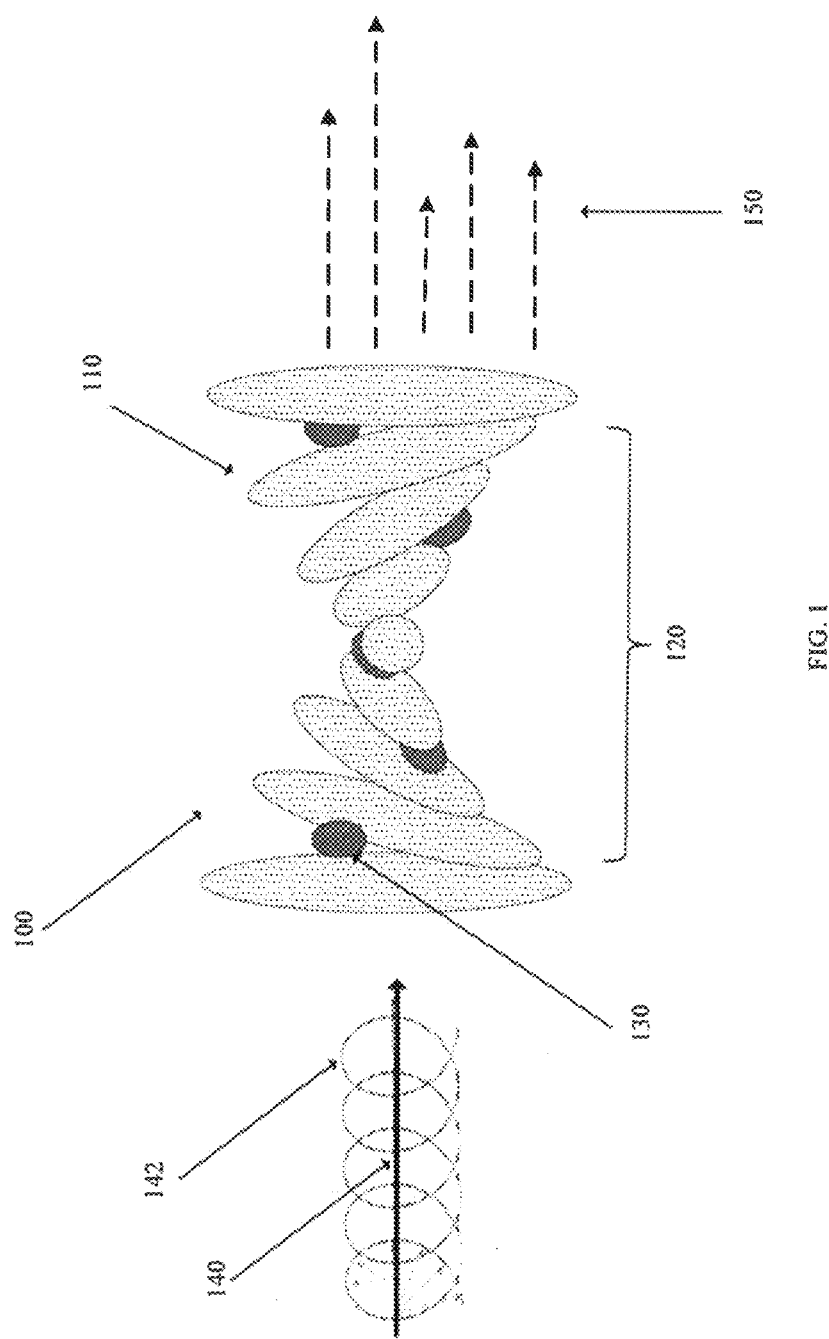
FIG. 1 depicts a liquid crystal film laser in accordance with some embodiments.

FIG. 1 depicts an LC film laser 100. The LC film laser 100 may be composed of an LC film having one or more liquid crystal components 110 in a nematic phase that are embedded in a polymer matrix. In some non-limiting embodiments, the polymer matrix with the liquid crystal components may form an emulsion. In other non-limiting embodiments, the polymer matrix with the liquid crystal components may be an LC film derived from a dried emulsion. The LC film may be a wet LC film or a dry LC film. The dry LC film may be fabricated by drying the wet LC film. The LC film, in general, may have any thickness suitable for its use. In some non-limiting embodiments, the LC film may have a thickness of about 30 μm to about 150 μm. Non-limiting examples of the liquid crystal film may have a thickness of about 30 μm, about 50 μm, about 70 μm, about 90 μm, about 100 μm, about 110 μm, about 130 μm, about 150 μm, and ranges between any two of these values including endpoints. In a non-limiting example, the liquid crystal film may have a thickness of about 100 μm.

The nematic phase liquid crystal components 110 in the LC composition may be aligned in a helical structure 120 defined by a helical twist angle. In some non-limiting embodiments, the liquid crystal components 110 may be composed of a mixture of one or more achiral liquid crystal materials doped with one or more chiral dopants, in which the one or more chiral dopants may induce a helical structure 120 in the liquid crystal components. In some non-limiting embodiments, the one or more chiral dopants may include one or more photo-inactive chiral dopants. In some non-limiting embodiments, the one or more chiral dopants may include one or more photo-active chiral dopants. In additional non-limiting embodiments, the chiral dopants may be composed of a mixture of one or more photo-inactive chiral dopants and one or more photo-active chiral dopant in any combination.

The one or more photo-inactive chiral dopants may each have at least a first enantiomeric structure and a second enantiomeric structure. The LC film may be composed of the one or more photo-inactive chiral dopants generally having at least a first enantiomeric structure or generally having at least a second enantiomeric structure. In another example, the LC film may be composed of one or more photo-inactive chiral dopants including a mixture of the first enantiomeric structure and the second enantiomeric structure in any combination. In some non-limiting examples, the chiral dopants in the mixture may include at least one photo-inactive chiral dopant and at least one photo-active chiral dopant.

The one or more photo-active chiral dopants may each have at least a first enantiomeric structure and a second enantiomeric structure. The LC film may be composed of the one or more photo-active chiral dopants generally having at least the first enantiomeric structure or generally having at least the second enantiomeric structure. In another example, the LC film may be composed of one or more photo-active chiral dopants having a mixture of at least the first enantiomeric structure and the second enantiomeric structure in any combination.

In some non-limiting embodiments composed of a combination of at least one photo-inactive chiral dopant and at least one photo-active chiral dopant, the at least one photo-inactive chiral dopant may have a chirality and the at least one photo-active chiral dopant may have the same chirality. In alternative embodiments, the at least one photo-inactive chiral dopant may have a first chirality, the at least one photo-active chiral dopant may have a second chirality, and the first chirality may differ from or be the opposite of the second chirality. It may be understood that the chirality of the photo-inactive chiral dopant, the photo-active chiral dopant, or both the photo-inactive and the photo-active chiral dopants may be right-handed. Alternatively, the chirality of the photo-inactive chiral dopant, the photo-active chiral dopant, or both the photo-inactive and the photo-active chiral dopants may be left-handed.

The one or more photo-active chiral dopants may have one or more photo-active chiral centers. In some non-limiting examples, the photo-active chiral dopant may include a plurality of photo-active chiral centers. It may be appreciated that a photo-active chiral dopant having more than one photo-active chiral center may adopt any one of a plurality of enantiomeric structures depending on the structure of the photo-active dopant. In some non-limiting embodiments, the photo-active chiral dopant may have one or more photo-active chiral centers, the one or more photo-active chiral centers including one or more of an azobenzyl, a fulgidyl, a chiral olefinyl, an azonaphthanyl, or a bis(azo) binaphthanyl moiety, or derivatives thereof. In embodiments of photo-active chiral dopants having multiple photo-active chiral centers, the photo-active chiral centers may be composed of the same chemical moiety. Alternatively, the multiple photo-active chiral centers may be composed of different chemical moieties.

One non-limiting example of a photo-active chiral dopant may include at least one bis(azo)binaphthanyl moiety. In some non-limiting examples, the photo-active chiral dopant may have one or more bis(azo)binaphthanyl moieties having a structure as depicted in Structure 1. Without limitation, in Structure 1, $R_1$ may be one of a mesogenic moiety, a $C_n$ alkyl moiety, or a $C_n$ alkoxyl moiety wherein "n" is an integer of 1 to 10, and $R_2$ may be one of a mesogenic moiety, a $C_m$ alkyl moiety, or a $C_m$ alkoxyl moiety wherein "m" is an integer of 1 to 10.

Structure 1

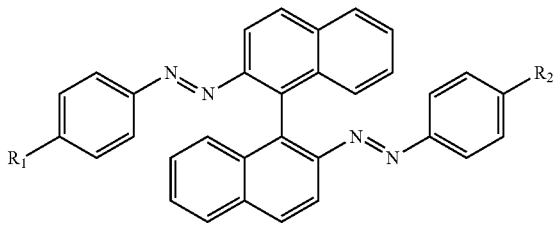

A mesogenic moiety may be defined as a chemical moiety that is structurally rigid, such as a straight-chain aliphatic moiety. Referring to Structure 1, $R_1$ and $R_2$ may each include, for example and without limitation, a $CH_3$—$(CH_2)_4$—O group.

The liquid crystal film may also include one or more emissive laser dyes 130. Emissive laser dyes 130 may have characteristics including an absorption spectrum including one or more absorption spectrum peaks, and an emission spectrum including one or more emission spectrum peaks. Non-limiting examples of emissive laser dyes 130 may include one or more of a rhodamine dye, a coumarin dye, a hydroxycoumarin dye, a fluorescein dye, a phycocyanine dye, a polyphenyl dye, a stylbene dye, a dicynanomethylene-styryl pyran dye, or derivatives thereof. In one non-limiting example, an emissive laser dye may be 4-(dicyanomethylene)-2-methyl-6-(4-dirnethylaminostyryl)-4H-pyran (DCM). DCM may have an absorbance spectrum having a peak absorbance wavelength of about 400 nm to about 575 nm. DCM may also have an emission spectrum having a peak emission wavelength of about 560 nm to about 700 nm. It may be understood that a liquid crystal film laser may emit an output radiation having a wavelength within a peak of the emission spectrum of the emissive dye. In a non-limiting example, the liquid crystal film may incorporate DCM as the emissive dye and may emit output radiation within the DCM peak emission wavelength of about 560 nm to about 700 nm.

The polymer matrix in which the liquid crystal components may be dispersed may be composed of a wet emulsion or a dried film derived from a wet emulsion. The polymer matrix may include one or more of a glycerin, an ethylene glycol, a polyvinyl alcohol, and derivatives thereof. In one non-limiting example, the polymer matrix may be composed of a solution of polyvinyl alcohol.

As depicted in FIG. 1, at least a portion of the LC film may be exposed to optical pump radiation 140. The optical pump radiation 140 may be supplied by an optical pump. In some non-limiting embodiments, the optical pump may be a pump laser. Some non-limiting examples of pump lasers may include one or more of a pulse laser, a continuous wave laser, or an LED laser. In one non-limiting example, the optical pump may be a second harmonic Nd:YAG pump laser. The optical pump radiation 140 supplied by the optical pump may have a wavelength within an absorption spectrum peak of an emissive laser dye 130. As a single non-limiting example, if the emissive laser dye 130 is DCM, then the optical pump may supply an optical pump radiation 140 having a wavelength within the absorption spectrum peak of DCM (about 400 nm to about 575 nm). As one non-limiting example, the optical pump may supply an optical pump radiation 140 having at least one wavelength of about 530 nm for an LC film laser having DCM as the emissive laser dye 130.

The optical pump may operate in a continuous wave mode or in a pulsed mode. An optical pump operating in a pulse mode may emit radiation having a pulse width of about 0.1 nsec to about 20 nsec. In some non-limiting examples, an optical pump operating in a pulse mode may emit radiation having a pulse width of about 0.1 ns, about 0.5 ns, about 1 ns, about 2 ns, about 4 ns, about 6 ns, about 8 ns, about 10 ns, about 12 ns, about 14 ns, about 16 ns, about 18 ns, about 20 ns, or a range between any two of these values including endpoints. In one non-limiting example, the optical pump operating in a pulse mode may emit radiation having a pulse width of about 6 ns.

In general, a pulsed optical pump may emit radiation at any pulse frequency attainable by the pump. In some embodiments, an optical pump may operate at a pulse frequency of about 1 Hz to about 20 Hz. In some non-limiting examples, an optical pump operating in a pulse mode may emit radiation at a frequency of about 1 Hz, about 2 Hz, about 4 Hz, about 6 Hz, about 8 Hz, about 10 Hz, about 12 Hz, about 14 Hz, about 16 Hz, about 18 Hz, about 20 Hz, or a range between any two of these values including endpoints. In one non-limiting example, the optical pump operating in a pulse mode may emit radiation at a frequency of about 1 Hz.

The LC film laser may also include one or more control devices configured to control at least one mode of the output radiation emitted by the optical pump. The at least one mode of the radiation may include one or more of an output radiation wavelength, an output radiation optical power, an output radiation pulse width, and an output radiation pulse phase. The LC film laser may further include one or more optical conditioning devices disposed between the optical pump and the film. Such optical conditioning devices may include, without limitation, one or more of a lens, a filter, a quarter-wave plate, a polarizer, a collimator, or one or more optical slits in any combination or order. In one non-limiting embodiment of the LC film laser, an optical conditioning device may include a polarizer device configured to circularly polarize the electromagnetic radiation emitted by the optical pump.

A liquid crystal laser 100, as depicted in FIG. 1, may rely upon the organization of the liquid crystal components 110 and polarization characteristics of the optical pump radiation 140 to produce the lasing conditions. Optical pump radiation 140 that is circularly polarized 142 in the opposite rotational sense to the optical chirality of the helical structure 120 may be transmitted throughout the film, thereby irradiating the emissive laser dye 130. It may be understood that optical pump radiation 140 that is circularly polarized 142 in the same rotational sense as the optical chirality of the helical structure 120 may be absorbed by the liquid crystal structure. The emissive laser dye 130 may absorb the circularly polarized pump radiation 142 if the pump radiation has at least one wavelength within the one or more absorbance spectrum peaks of the emissive laser dye. The emissive laser dye 130 may then emit radiation having a wavelength within an emission spectrum peak of the dye.

If the emissive laser dye 130 absorbs circularly polarized radiation, then the dye will emit circularly polarized radiation. Without being bound by theory, in the frame of reference of the circularly polarized emitted radiation from the emissive laser dye 130, the helical structure 120 of the liquid crystal components 110 may appear to form a virtual 2-dimensional Bragg crystal. Emitted radiation from the emissive laser dye 130 may be reflected by the liquid crystal components 110 only at wavelengths λ fulfilling the Bragg reflection criterion of $\lambda=(2\,n\,d\,\sin\,\theta)$, in which d is a spacing between scattering planes in the virtual 2-dimensional Bragg crystal, θ is an incidence angle of light with a scattering plane of the crystal, and n is an integer. It may be understood that the spacing between scattering planes, d, in the virtual 2-dimensional Bragg crystal in the liquid crystal film may depend on the twist angle of the helical structure 120. The helical twist angle may also result in a photon band structure within the liquid crystal material equivalent to the Bragg reflection criterion. If the photon band structure has a band energy comprising at least one wavelength within an emission spectrum peak of the at least one emissive dye, then the photon band structure may provide appropriate conditions for the lasing process. The propagating radiation having a center wavelength λ may then stimulate radiation emission from other emissive laser dye 130 molecules. In this manner, the LC film laser may produce a narrow band, coherent laser output 150 having a wavelength of about λ within the one or more emission spectrum peaks of the at least one emissive laser dye 130. It may be appreciated that the wavelength of the laser output 150 may thus depend, at least in part, on one or more of the emission spectrum of the at least one emissive dye 130 and the twist angle of the helical structure 120 of the liquid crystal components 110.

A liquid crystal material 110 composed of only achiral nematic liquid crystal materials may not display a helical structure 120, and, therefore, may not provide diffraction conditions to induce stimulated emission in a dispersed emissive laser dye 130. One or more chiral dopants added to the liquid crystal material 110 may induce a helical structure 120 in the liquid crystal material, thus providing diffraction conditions that may lead to a laser output 150. It may be understood that a photo-inactive chiral dopant may induce a helical structure 120 in the achiral nematic liquid crystal materials, but the helical structure may have a fixed helical twist angle since the photo-inactive chiral dopant may not change its structure. As a result, the laser output 150 of such a system may only produce laser radiation around a single central wavelength.

A photo-active chiral dopant may have at least one photo-active chiral center. Such centers may respond to the absorption of radiation by altering the enantiomeric structure of the dopant. In some non-limiting examples, the dopant structure may transition from a first enantiomeric structure to a second enantiomeric structure upon absorption by the at least one photo-active chiral center of radiation having at least a first transition wavelength. In some non-limiting examples, the dopant structure may transition from a second enantiomeric structure to a first enantiomeric structure upon absorption by the at least one photo-active chiral center of radiation having at least a second transition wavelength. The first transition wavelength and the second transition wavelength may be the same wavelength or a different wavelength. In some non-limiting embodiments of photo-active chiral dopants, the first enantiomeric structure may have an E configuration about a double bond. In some other non-limiting embodiments of photo-active chiral dopants, the second enantiomeric structure may have a Z configuration about a double bond. It may be appreciated that enantiomeric structures may result from other conformational changes about photo-active centers, such as the breaking and formation of lactone rings or the breaking and formation of internal anhydride bonds.

It may be appreciated that photo-active chiral dopants may have a single photo-active chiral center, two photo-active chiral centers, or a plurality of photo-active chiral centers. Photo-active chiral dopants having multiple photo-active chiral centers may have multiple photo-active centers composed of the same chemical moiety, or multiple photo-active centers each center composed of a different chemical moiety. FIGS. 2A-2D depict an exemplary class of photo-active chiral dopants having two photo-active chiral centers as depicted in Structure 1, above.

Depicted in FIGS. 2A-2D is a photo-active chiral dopant 200 composed of a binaphthanyl 210 core bonded to two azo bridges 220a,b at the 2 and 2' positions, respectively, thereby forming a bis(azo)binaphthanyl material. Each azo bridge 220a, 220b is also bonded to a para-phenyl moiety 230a,b, respectively. Each of the two para-phenyl moieties 230a,b, in to bonded to a substituent group, $R_1$ and $R_2$, respectively. Substituent groups $R_1$ and $R_2$ may constitute different groups or they may constitute the same group. In some non-limiting examples, substituent group $R_1$ may constitute one of a mesogenic moiety, a $C_n$ alkyl moiety, or a $C_n$ alkoxyl moiety in which "n" may generally be any integer. In some non-limiting examples, "n" may be an integer between 1 and 10, including endpoints. In some non-limiting examples, "n" may be 1, 2, 3, 4, 5, 6, 7, 8, 9, or 10. In some other non-limiting examples, substituent group $R_2$ may constitute one of a mesogenic moiety, a $C_m$ alkyl moiety, or a $C_m$ alkoxyl moiety in which "m" may generally be any integer. In some non-limiting examples, "m" may be an integer between 1 and 10, including endpoints. In some non-limiting examples, "m" may be 1, 2, 3, 4, 5, 6, 7, 8, 9, or 10. Substituent groups $R_1$ and $R_2$ may constitute different groups or they may constitute the same group. In one non-limiting example, $R_1$ and $R_2$ may both include $CH_3$—$(CH_2)_4$—O— (1-pentanoyl) groups.

Figure 2D:
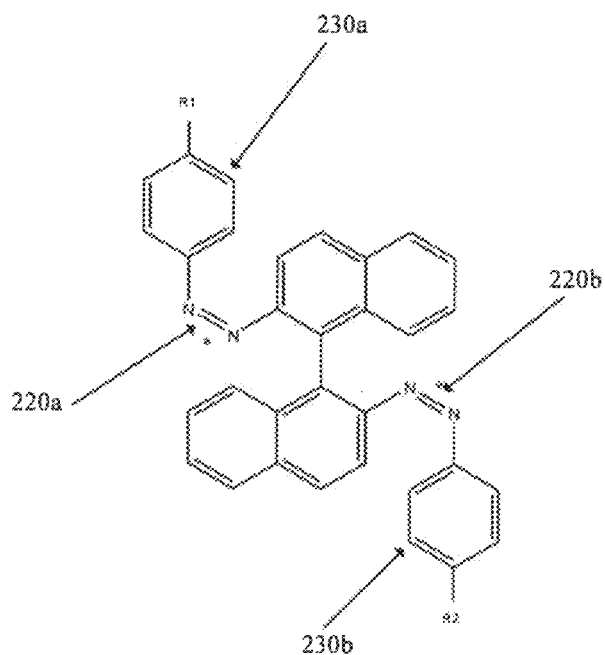

As depicted in FIGS. 2A-2D, each of the two azo bridges 220a,b may be a photo-active chiral center, as denoted by the asterisk (*). In one enantiomeric structure, the photo-active chiral dopant 200 may have the para-phenyl moieties 230a,b extended front the binaphthanyl 210, thereby placing each of the two azo bridges 220a,b in the E conformation (a first enantiomeric structure). Upon absorbance of a photon of radiation having at least one first transition wavelength, either of the two azo bridges 220a,b may photo-isomerize to the Z configuration. FIG. 2B depicts the photo-active chiral dopant 200 in a second enantiomeric structure in which the second azo bridge 220b adopts a Z configuration while the first azo bridge 220a retains the E conformation. FIG. 2C depicts the photo-active chiral dopant 200 in a third enantiomeric structure in which the first azo bridge 220a adopts a Z configuration while the second azo bridge 220b retains the E conformation. For a photo-active chiral dopant 200 in which $R_1$ and $R_2$ are the same substituent group, FIGS. 2B and 2C may be identical, and the second enantiomeric structure and the third enantiomeric structure may be the same. Alternatively, if $R_1$ and $R_2$ are different substituent groups, then FIGS. 2B and 2C may not be identical, and the second enantiomeric structure may differ from the third enantiomeric structure. FIG. 2D depicts the photo-active chiral dopant 200 after absorbance of a second photon of radiation having at least one first transition wavelength. As a result of a second photo-isomerization, both azo bridges 220a,b may adopt a Z configuration, thereby forming a fourth enantiomeric structure. It may be appreciated that the hindered Z isomer may be less energetically favored than the more extended E isomer. Without being bound by theory, radiation having a transition wavelength at a higher energy may be required to convert an E configuration to a Z configuration, while radiation having a transition wavelength at a lower energy may be able to convert a Z configuration to an E configuration.

Although a mechanism of photo-induced isomerism of a photo-active chiral dopant is disclosed above with respect to a photo-active chiral dopant depicted by Structure 1, it may be appreciated that the general mechanism of transition between enantiomers by absorption of radiation at a photo-active center may apply to other photo-active chiral dopants. Thus, in general, a photo-active chiral dopant having a single photo-active center may transition from a first enantiomeric structure to a second enantiomeric structure upon absorption of radiation having at least a first transition wavelength. Similarly, a photo-active chiral dopant having a single photo-active chiral center may transition from a second enantiomeric structure to a first enantiomeric structure upon absorption of radiation having at least a second transition wavelength.

It may be understood that, the helical twist angle of the liquid crystal mixture may depend, at least in part, on one or more enantiomeric structures of the at least one photo-active chiral dopant. In some non-limiting embodiments, a helical twist angle of a liquid crystal mixture may be due at least in part to a structure and a concentration of one or more photo-inactive chiral dopants, a structure and a concentration of one or more photo-active chiral dopants, or the combined structures and concentrations of a mixture of both the photo-inactive and the photo-active chiral dopants.

Figures 3A, 3B:
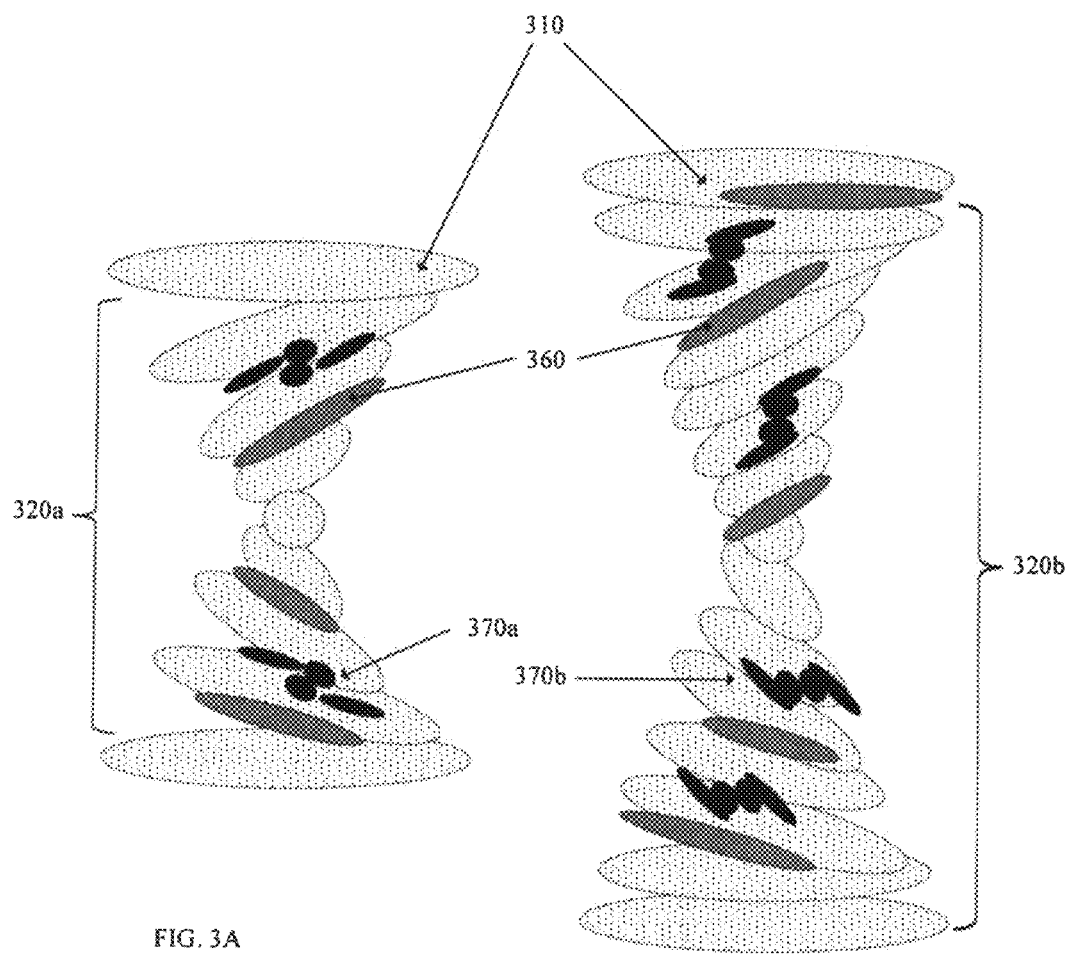
FIGS. 3A and 3B depict changes in the helical twist angle of a nematic phase liquid crystal composition in accordance with some embodiments.

FIGS. 3A and 3B depict a change in the helical twist angle of a liquid crystal mixture that includes one or more photo-active chiral dopants upon a change in the structure of the photo-active chiral dopants. Both FIGS. 3A and 3B depict nematic phase liquid crystal components 310 doped with a photo-inactive chiral dopant 360 and a photo-active chiral dopant 370a,b. For the purpose of illustration only, the photo-active chiral dopant 370a,b is depicted as having a structure similar to Structure 1. Thus, photo-active chiral dopant 370a may have an E, E' structure as depicted in FIG. 2A. Photo-active chiral dopant 370b may have a Z, Z' structure as depicted in FIG. 2D. Structures similar to FIGS. 2B and 2C are not shown. As depicted in FIGS. 3A and 3B, the structure of the photo-active chiral dopant 370a,b may have an effect on the helical structure 320a,b of the nematic phase liquid crystal components 310. Thus, the helical structure 320a may have a larger helical twist angle than helical structure 320b, due, at least in part, to the more extended structure of the photo-active chiral dopant 370a. The helical structure 320b may have a smaller helical twist angle due to the more compact structure of the photo-active chiral dopant 370b.

Although only two helical structures 320a,b are depicted in FIGS. 3A and 3B, it may be appreciated that the helical structure 320a,b of the nematic phase liquid crystal components 310 may range over a continuum of helical twist angles between those depicted in FIGS. 3A and 3B. Without being bound by theory, the helical twist angle may be due to an ensemble of enantiomeric structures of the photo-active chiral dopant 370a,b attainable through absorption of radiation having an appropriate transition wavelength at the photo-active centers. The number of photo-active chiral dopants having a particular enantiomeric structure may be due, at least in part, to one or more of the concentration of the photo-active chiral dopant in the liquid crystal mixture, the number of possible enantiomeric structures attainable by the photo-active chiral dopants, and the concentration of each of the possible enantiomeric structures. The concentration of each possible enantiomeric structure may depend, at least in part, on a length of time the liquid crystal mixture is exposed to radiation having at least one transition wavelength, a transition radiation wavelength, and a radiant emittance by the source of illumination at the transition radiation wavelength.

FIG. 4 is a flow chart for an illustrative method of fabricating a photo-tunable liquid crystal composition according to an embodiment. A first composition may be formed 410 composed of an achiral nematic liquid crystal material, a photo-active chiral dopant, a photo-inactive chiral dopant, and an emissive dye. In some non-limiting examples, the first composition in general may be composed of any one or more of the materials disclosed above. Based on the mechanism of photo tuning of the film as disclosed above, it may be understood that an amount of the at least one photo-active dopant and an amount of the at least one photo-inactive dopant may be chosen to induce a helical twist angle of the liquid crystal material dispersed in the polymer matrix. A weight ratio of the at least one photo-active chiral dopant to the at least one photo-inactive chiral dopant, and a weight ratio of the sum of the at least one photo-active chiral dopant and the at least one photo-inactive chiral dopant to the at least one achiral nematic liquid crystal may be chosen, at least in part, on an emission spectrum of the at least one emissive dye. Without being bound by theory, the amount and type of the chiral dopants may be chosen to cause one or more twist angles of the achiral nematic liquid crystal material equivalent to a Bragg crystal structure able to reflect a wavelength of radiation within the emission spectrum of the laser emissive dye.

In sonic non-limiting examples, a weight ratio of the at least one photo-active chiral dopant to the at least one photo-inactive chiral dopant may be about 1:6.5 to about 1:11. Non-limiting examples of such weight ratios of the at least one photo-active chiral dopant to the at least one photo-inactive chiral dopant may be about 1:6.5, about 1:7, about 1:8, about 1:9, about 1:10, about 1:11, or ranges between any two of these values including endpoints. In another non-limiting example, a weight ratio of the sum of the at least one photo-active chiral dopant and the at least one photo-inactive chiral dopant to the at least one achiral nematic liquid crystal material may be about 1:4.5 to about 1:5. Non-limiting examples of such weight ratios of the sum of the at least one photo-active chiral dopant and the at least one photo-inactive chiral dopant to the at least one achiral nematic liquid crystal material may be about 1:4.5, about 1:4.6, about 1:4.7, about 1:4.8, about 1:4.9, about 1:5.0, or ranges between any two of these values including endpoints. The amount of the at least one emissive dye as a weight percent of the total weight of the first composition may be about 0.5 wt % to about 2 wt %. Non-limiting examples of such amounts of the at least one emissive dye as a weight percent of the total weight of the first composition may be about 0.5 wt %, about 0.75 wt %, about 1.0 wt %, about 1.25 wt %, about 1.5 wt %, about 1.75 wt %, about 2 wt %, or ranges between any two of these values including endpoints.

The first composition tnay be contacted 420 with a polymer matrix solution to form an emulsion. The polymer matrix solution may be composed of a solution of polymer matrix in a solvent. The polymer matrix may be present in the polymer matrix solution at a concentration of about 2.5 wt % to about 15 wt %. Non-limiting examples of the weight of the polymer matrix in the solution may be about 2.5 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, or ranges between any two of these values including endpoints. As one example, the polymer matrix may be present in the the polymer matrix solution at a concentration of about 15 wt %.

The first composition may be contacted 420 with the liquid polymer matrix in an amount wherein the weight ratio of the at least one achiral nematic liquid crystal material in the first composition to the polymer matrix may be about 1:9 to about 1:40. Non-limiting examples of such a weight ratio of the at least one achiral nematic liquid crystal material to the polymer matrix may be about 1:9, about 1:10, about 1:20, about 1:30, about 1:40, or ranges between any two of these values including endpoints.

In some non-limiting embodiments, contacting 420 the first composition with the polymer matrix may include stirring an amount of the first composition with an amount of the polymer matrix solution. In some other embodiments, contacting 420 the first composition with the polymer matrix may include homogenizing an amount of each solution in a homogenizing device.

FIG. 5 is a flow chart of an illustrative method of fabricating a liquid crystal film for use in a photo-tunable liquid crystal film laser according to an embodiment. As disclosed in FIG. 5, a first composition may be formed 510 composed of an achiral nematic liquid crystal material, a photo-active chiral dopant, a photo-inactive chiral dopant, and an emissive dye. Chemical components and ratios thereof may be similar to those disclosed above with respect to FIG. 4. The first composition may be contacted 520 with a liquid polymer matrix to form an emulsion in any manner including those disclosed above with respect to FIG. 4. The emulsion may be applied 530 to a substrate to form a wet film. The wet film may be applied 530 to the substrate by any appropriate manner including, but not limited to, the use of a calibrated wet film application device, or an ink-jet printing device. The wet film may have a thickness of about 30 μm to about 150 μm. Non-limiting examples of the liquid crystal wet film may have a thickness of about 30 μm, about 50 μm, about 70 μm, about 90 μm, about 100 μm, about 110 μm, about 130 μm, about 150 μm, or ranges between any two of these values including endpoints. In a non-limiting example, the liquid crystal wet film may have a thickness of about 100 μm.

In some embodiments, the substrate may be composed of a material that is configured to transmit radiation having at least one wavelength of about 200 nm to about 700 nm. In some non-limiting examples, the substrate may be a glass, a wood, a tissue, a plastic, or a polymer.

The wet film may then be dried 540 on the substrate. In some non-limiting examples, the film may be dried 540 for about 30 minutes to about 60 minutes. Non-limiting examples of the time to thy the wet film may include about 30 min, about 35 min, about 40 min, about 45 min, about 50 min, about 55 min, about 60 min, or ranges between any two of these values including endpoints. In a non-limiting example, the wet film may be dried 540 for about 60 min. The film may be dried 540 at an ambient temperature which may include temperatures of about 20° C. to about 30° C.

Figure 6:
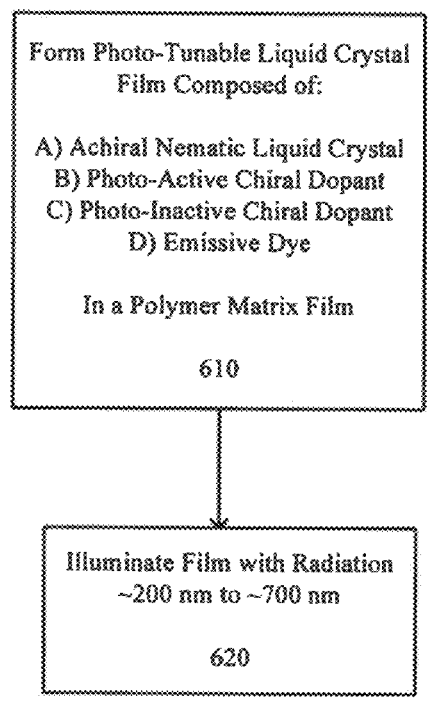
FIG. 6 is a flow diagram of a method of photo-tuning a liquid crystal film in accordance with some embodiments.

FIG. 6 is a flow chart for an illustrative method of tuning a photo-tunable liquid crystal film according to an embodiment. A photo-tunable liquid crystal film may be formed 610 from an emulsion composed of a liquid crystal material including an achiral nematic liquid crystal material, a photo-active chiral dopant, a photo-inactive chiral dopant, and an emissive dye in a polymer matrix film. Such a film may be formed 610 as disclosed above with respect to FIG. 5 of components and their amounts as disclosed above with respect to FIG. 4. The film may be tuned by illuminating 620 the film with radiation having a wavelength of about 200 nm to about 700 nm. Non-limiting examples of such radiation may have a wavelength of about 200 nm, about 250 nm, about 300 nm, about 350 nm, about 400 nm, about 450 nm, about 500 nm, about 550 nm, about 600 nm, about 650 nm, about 700 nm, or a range between any two of these values including endpoints.

As disclosed above, tuning a liquid crystal film may include illuminating 620 the film with radiation capable of causing a change in enantiomeric structures of one or more photo-active chiral dopants incorporated into the film. The one or more photo-active centers of a photo-active chiral dopant may absorb radiation at a first transition wavelength, which may cause the photo-active chiral dopant to transition from at least a first enantiomeric structure to at least a second enantiomeric structure. A change in the structure of the photo-active chiral dopant from the first enantiomeric structure to the second enantiomeric structure may result in the host achiral nematic liquid crystal material assuming a first helical twist angle that may select a first wavelength emitted by a liquid crystal film laser using such a tuned film. In some non-limiting examples, the first transition wavelength may be about 200 nm to about 500 nm. Non-limiting examples of such a first transition wavelength may be about 200 nm, about 250 nm, about 300 nm, about 350 nm, about 400 nm, about 450 nm, about 500 nm, or a range between any two of these values including endpoints. In one non-limiting example, the first transition wavelength may be about 365 nm.

The liquid crystal film may be illuminated 620 by radiation having at least the first transition wavelength for generally any period of time. The photo-tunable liquid crystal film may be illuminated 620 by a source of radiation having at least one wavelength of about the first transition wavelength for about 20 seconds to about 18000 seconds. Non-limiting examples of such a time for illuminating 620 the film at the first transition wavelength may be about 20 seconds, about 50 seconds, about 100 seconds, about 200 seconds, about 500 seconds, about 1000 seconds, about 2000 seconds, about 5000 seconds, about 10000 seconds, about 20000 seconds, about 50000 seconds, about 100000 seconds, about 200000 seconds, or a range between any two of these values including endpoints.

It may be appreciated that the length of time for illumining 620 the liquid crystal film at the first transition wavelength may depend, at least in part, on an amount of the photo-active chiral dopant in the at least portion of the photo-tunable liquid crystal film and a radiant emittance of the source of radiation. An amount of twist angle induced in the achiral nematic liquid crystal host may depend on the amount of each of the attainable enantiomeric structures available to the photo-active chiral dopant. The amount of the enantiomeric structures, in turn, may depend on the amount of photo-active chiral dopant present, as well as the number of enantiomers created by photo absorption at the photo-active chiral centers of the dopants. The number of photo-active chiral dopants that may transition to a second enantiomeric structure may depend on the probability of the photo-active chiral center absorbing a photon at the transition wavelength. The probability, in turn, may depend on the radiant emittance of the radiation source.

As disclosed above, tuning a liquid crystal film may include illuminating 620 the film with radiation capable of causing a change in enantiomeric structures of one or more photo-active chiral dopants incorporated into the film. The photo-active chiral dopant may also absorb radiation at a second transition wavelength, which may cause the photo-active chiral dopant to transition from the second enantiomeric structure to the first enantiomeric structure. A change in the structure of the photo-active chiral dopant from the second enantiomeric structure to the first enantiomeric structure may result in the host achiral nematic liquid crystal material assuming a second helical twist angle that may select a second wavelength emitted by a liquid crystal film laser using such a tuned film. In some non-limiting examples, the second transition wavelength may be about 400 nm to about 700 nm. Non-limiting examples of such a first transition wavelength may be about 400 nm, about 450 nm, about 500 nm, about 550 nm, about 600 nm, about 650 nm, about 700 nm, or a range between any two of these values including endpoints. In one non-limiting example, the first transition wavelength may be about 530 nm.

The liquid crystal film may be illuminated 620 by radiation having at least the second transition wavelength for generally any period of time. The photo-tenable liquid crystal film may be illuminated 620 by a source of radiation having at least one wavelength of about the second transition wavelength for about 20 seconds to about 18000 seconds. Non-limiting examples of such a time for illuminating 620 the film at the second transition wavelength may be about 20 seconds, about 50 seconds, about 100 seconds, about 200 seconds, about 500 seconds, about 1000 seconds, about 2000 seconds, about 5000 seconds, about 10000 seconds, about 20000 seconds, about 50000 seconds, about 100000 seconds, about 200000 seconds, or a range between any two of these values including endpoints.

It may be appreciated that the length of time for illuminating 620 the liquid crystal film at the second transition wavelength may depend, at least in part, on an amount of the photo-active chiral dopant in the portion of the photo-tunable liquid crystal film and a radiant emittance of the source of radiation, as disclosed above, with respect to enantiomeric transitions at the second transition wavelength.

It may be appreciated that the above disclosure may equally apply to photo-active chiral dopants having more than two enantiomeric structures. Such photo-active chiral dopants may adopt any one of a plurality of enantiomeric structures available to the photo-active chiral dopant based on its structure including the number and types of photo-active chiral centers therein. Each photo-active chiral center may absorb radiation at one or more transition wavelengths depending on the structures of the plurality of enantiomers. The resulting helical twist angle of the nematic liquid crystal material may result from the ensemble enantiomeric structures of the photo-active chiral dopants along with those of the photo-inactive chiral dopants.

EXAMPLES

Example 1

A Photo-Tunable Liquid Crystal Composition

A photo-tunable liquid crystal composition was fabricated from a liquid crystal mixture dispersed in a matrix solution. The liquid crystal mixture included an achiral nematic liquid crystal material (MLC2048, Merck KGaA, Darmstadt, Germany), a right-handed photo-inactive chiral dopant (R811, Merck KGaA, Darmstadt, Germany), a right-handed photo-active chiral dopant having a structure disclosed above as Structure 1, and an emissive laser dye (DCM). The weight percent of the photo-active chiral dopant to a final weight of the first composition was about 2.5 wt %, the weight percent of the photo-inactive chiral dopant to the final weight of the first composition was about 19.6 wt %, and the weight percent of the emissive laser dye to the liquid crystal mixture was about 0.5 wt %. The polymer matrix was prepared as a 15 wt % solution of polyvinyl alcohol in water. About 10 wt % of the liquid crystal mixture was dispersed in the matrix solution.

Example 2

A Method of Fabricating a Photo-Tunable Liquid Crystal Composition

A composition as disclosed above in Example 1 was fabricated by stirring together the liquid crystal mixture and the matrix solution at ambient temperature (about 20° C. to about 30° C.) in an emulsifier device. The emulsifier device was set to 90 rpm and the liquid crystal mixture and the matrix solution were stirred together for about 5 minutes to form an emulsion.

Example 3

A Method of Fabricating a Photo-Tunable Liquid Crystal Film

The emulsion disclosed in Example 2 was applied to a glass substrate at ambient temperature (about 20° C. to about 30° C.) using a wet film applicator. The wet film was about 100 μm thick. The wet film was allowed to dry at ambient temperature for about 1 hour. After drying, the dried film had a thickness of about 40 μm.

Example 4

A Photo-Tunable Liquid Crystal Film Laser

A film similar to that disclosed in Example 3 was used as a basis of a liquid crystal film laser. The optical pump device was a second-harmonic neodymium-doped yttrium aluminum garnet (Nd:YAG) pump laser that produced linearly polarized radiation of about 532 nm. The optical pump was operated at a pulse mode with radiation pulses having a pulse time of about 6 ns at a frequency of about 1 Hz. The linear polarized radiation was converted to circularly polarized radiation by passing the linearly polarized radiation through a quarter wave plate. The circularly polarized radiation, having a spot size with a diameter of about 120 μm, was focused on the film.

Example 5

A Method of Tuning a Liquid Film Laser

Figure 7:
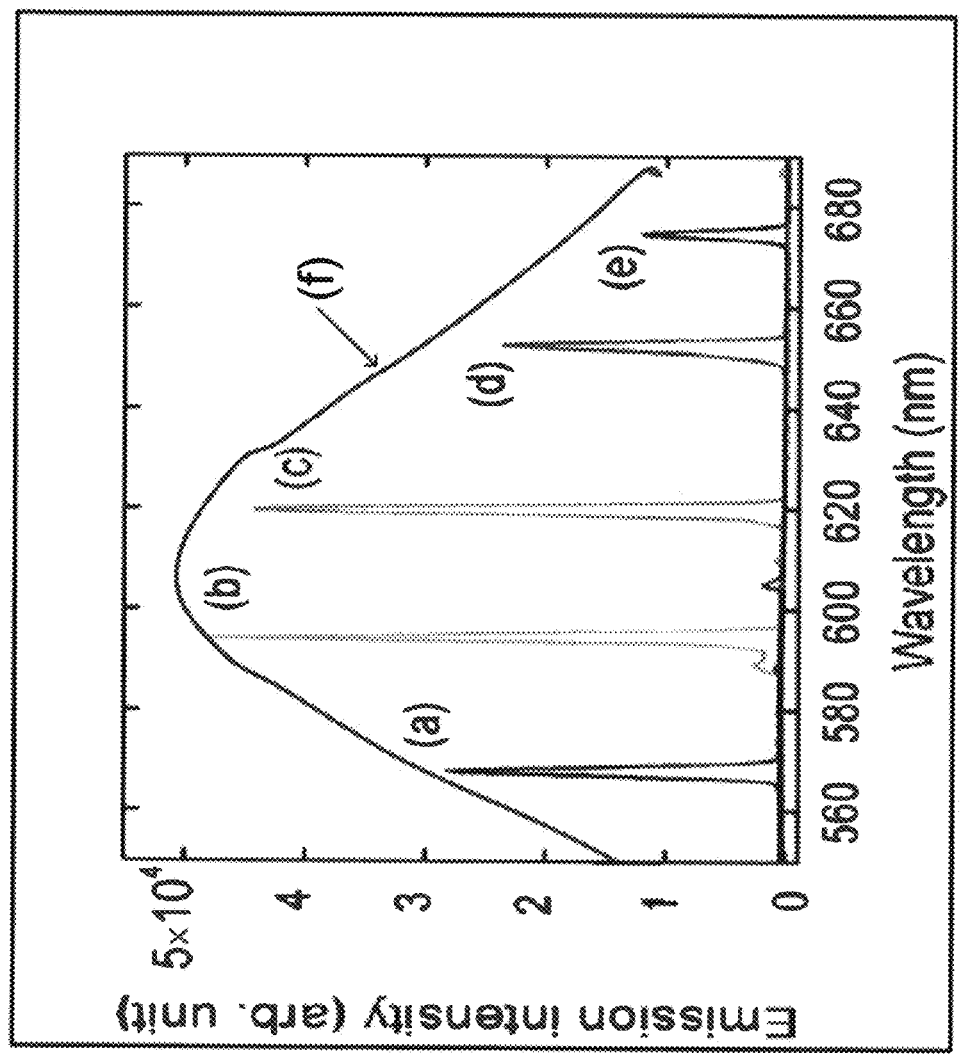
FIG. 7 is a plot of output wavelengths of a photo-tunable liquid crystal film laser based on an amount of photo-tuning time in accordance with some embodiments.

FIG. 7 depicts the output wavelength of the photo-tunable liquid crystal film laser as disclosed in Example 4 under various tuning conditions. After the initial fabrication of the liquid crystal film, the laser had an output wavelength of about 560 nm (a). The film was exposed to UV radiation having a wavelength of 365 nm, corresponding to a first transition wavelength for the photo-active chiral dopant. The UV source had an intensity of about 15.14 mW/cm$^2$, and the film was exposed to the first transition wavelength of 365 nm for about 55 seconds. As a result of the exposure to the 365 nm radiation, the liquid crystal film laser output had a wavelength of about 675 nm (e). The film was then exposed to 9.88 mW/cm$^2$ radiation having a wavelength of 532 nm radiation, corresponding to a second transition wavelength, for about 1 minute. The liquid crystal film laser output wavelength returned to 567 nm (a).

As depicted in FIG. 7, the output wavelength of the photo-tunable liquid crystal film laser depends at least in part on the exposure time of the film to radiation of the first transition wavelength or the second transition wavelength. Thus, a film after fabrication, and without exposure to radiation having a first transition wavelength, may produce a laser output of about 567 nm. After 2 seconds exposure of the film to the 365 nm (first transition wavelength) radiation, the liquid crystal film laser produced output radiation at about 595 nm (b). After about 7 seconds of exposure of the film to the 365 nm (first transition wavelength) radiation, the liquid crystal film laser produced output radiation at about 620 nm (c). After about 23 seconds of exposure of the film to the 365 nm (first transition wavelength) radiation, the liquid crystal film laser produced output radiation at about 653 nm (d). The relative output intensity at each of the wavelengths, (a), (b), (e), and (d) may be observed to follow the emission spectrum peak of DCM (f) over those wavelengths. It may further be observed that the change in the laser output wavelength was approximately linear with exposure time to the first transition wavelength.

It may be appreciated that the LC film tunable laser disclosed above presents a simple and easily tuned laser device. The LC laser film may be readily manufactured either mechanically or by means of an electronic printing device in a variety of sizes and shapes. The laser output wavelength may be readily chosen based on the type of emissive laser dye as well as the composition and concentrations of both the photo-inactive and photo-active chiral dopants. Additionally, the tuning process based on exposure time of the film to readily available light sources may be rapid and readily controllable.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be father understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A photo-tunable liquid crystal composition comprising:
   a polymer matrix; and
   a liquid crystal mixture dispersed within the polymer matrix, wherein the liquid crystal mixture comprises:
      at least one achiral nematic liquid crystal material;
      at least one photo-active chiral dopant, wherein the at least one photo-active chiral dopant has a structure of

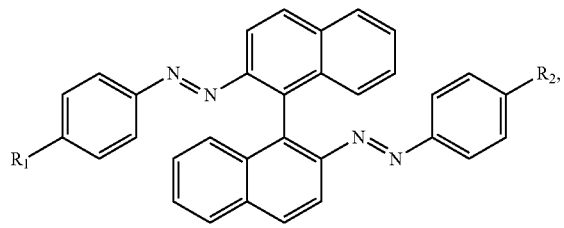

and wherein $R_1$ and $R_2$ are $CH_3$—$(CH_2)_4$—O;
   at least one photo-inactive chiral dopant; and
   at least one emissive dye.

2. The composition of claim 1, wherein the composition is a film of a dried emulsion.

3. The composition of claim 2, wherein the film has a thickness of 30 μm to 150 μm.

4. The composition of claim 1, wherein the polymer matrix comprises one or more of a glycerin, an ethylene glycol, a polyvinyl alcohol, and derivatives thereof.

5. The composition of claim 1, wherein a weight ratio of the at least one achiral nematic liquid crystal material to the polymer matrix is 1:9 to 1:40.

6. The composition of claim 1, wherein the at least one photo-active chiral dopant includes a first enantiomeric structure and a second enantiomeric structure, wherein the at least one photo-active chiral dopant is configured to transition from the first enantiomeric structure to the second enantiomeric structure upon absorption of radiation having at least a first transition wavelength.

7. The composition of claim 1, wherein the at least one photo-active chiral dopant has at least one photo-active chiral center.

8. The composition of claim 1, wherein the at least one photo-active chiral dopant has at least one photo-active chiral center comprising one or more of an azobenzyl, a fulgidyl, a chiral olefinyl, an azonaphthanyl, and a bis(azo) binaphthanyl moiety.

9. The composition of claim 1, wherein the at least one photo-active chiral dopant is a bis(azo)binaphthanyl chiral material.

10. The composition of claim 1, wherein the at least one photo-inactive chiral dopant has a chirality, and the at least one photo-active chiral dopant has the chirality.

11. The composition of claim 1, wherein the at least one photo-inactive chiral dopant has a first chirality, the at least one photo-active chiral dopant has a second chirality, and the first chirality differs from the second chirality.

12. The composition of claim 1, wherein a weight ratio of the at least one photo-active chiral dopant to the at least one photo-inactive chiral dopant is 1:6.5 to 1.11.

13. The composition of claim 1, wherein a weight ratio of a sum of the at least one photo-active chiral dopant and the at least one photo-inactive chiral dopant to the at least one achiral nematic liquid crystal material is 1:4.5 to 1:5.

14. The composition of claim 1, wherein the at least one emissive dye is one or more of a rhodamine dye, a coumarin dye, a hydroxycoumarin dye, a fluorescein dye, a phycocyanine dye, a polyphenyl dye, a stylbene dye, a dicynanomethylene-styryl pyran dye, or derivatives thereof.

15. The composition of claim 1, wherein the at least one emissive dye is 4-(dicyanomethylene) -2-methyl-6-(4-dimethylaminostyryl)-4H-pyran.

16. The composition of claim 1, wherein:
a weight ratio of the at least one photo-active chiral dopant to the at least one photo-inactive chiral dopant is 1:6.5 to 1:11,
a weight ratio of a sum of the at least one photo-active chiral dopant and the at least one photo-inactive chiral dopant to the at least one achiral nematic liquid crystal material is 1:4.5 to 1:5, and
a weight percent of the at least one emissive dye to a weight of the liquid crystal mixture is 0.5 wt % to 2 wt %.

17. The composition of claim 1, further comprising a solvent configured to form a polymer matrix solution with the polymer matrix, wherein the polymer matrix is present in the polymer matrix solution at a concentration of 2.5 wt % to 15 wt %.

18. The composition of claim 1, wherein the polymer matrix is a polyvinyl alcohol, and the composition further comprises water configured to form a polymer matrix solution with the polyvinyl alcohol, wherein the polyvinyl alcohol is present in the polymer matrix solution at a concentration of 15 wt %.

19. A photo-tunable liquid crystal laser, the laser comprising:
a photo-tunable liquid crystal laser film that comprises:
an emulsion polymer matrix; and
a liquid crystal mixture dispersed within the polymer matrix, wherein the liquid crystal mixture comprises:
at least one achiral nematic liquid crystal material;
at least one photo-active chiral dopant, wherein the at least one photo-active chiral dopant has a structure of

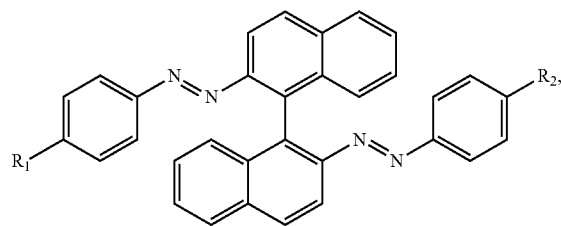

and wherein $R_1$ and $R_2$ are $CH_3-(CH_2)_4-O$;
at least one photo-inactive chiral dopant; and
at least one emissive dye; and
an optical pump configured to illuminate at least a portion of the photo-tunable liquid crystal laser film.

20. The laser of claim 19, wherein the at least one emissive dye has one or more absorbance spectrum peaks of 400 nm to 575 nm.

21. The laser of claim 19, wherein the optical pump is configured to emit radiation having at least one wavelength of 530 nm.

22. The laser of claim 19, wherein the optical pump comprises one or more of a pulse laser, a continuous wave laser, and an LED laser.

23. The laser of claim 19, wherein the optical pump is configured to operate at a pulse frequency of 1 Hz with a pulse width of 6 ns.

24. The laser of claim 19, further comprising a control device configured to control at least one mode of a radiation emitted by the optical pump, the at least one mode including one or more of an output radiation wavelength, an output radiation optical power, an output radiation pulse width, and an output radiation pulse phase.

25. The laser of claim 19, further comprising one or more optical conditioning devices disposed between the optical pump and the photo-tunable liquid crystal laser film.

26. The laser of claim 19, wherein the laser is configured to emit a laser radiation having a wavelength depending at least in part on an emission spectrum of the at least one emissive dye and a helical twist angle of the liquid crystal mixture.

27. The laser of claim 26, wherein the helical twist angle of the liquid crystal mixture depends, at least in part, on one or more enantiomeric structures of the at least one photo-active chiral dopant.

28. The laser of claim 19, wherein the at least one emissive dye comprises 4-(dicyanomethylene)-2-methyl-6-(4-dimethylaminostyryl)-4H-pyran and the laser is configured to emit a laser radiation having a wavelength of 560 nm to 700 nm.

29. A method of fabricating a photo-tunable liquid crystal composition comprising:

forming a first composition comprising at least one achiral nematic liquid crystal material, at least one photo-active chiral dopant, wherein the at least one photo-active chiral dopant has a structure of

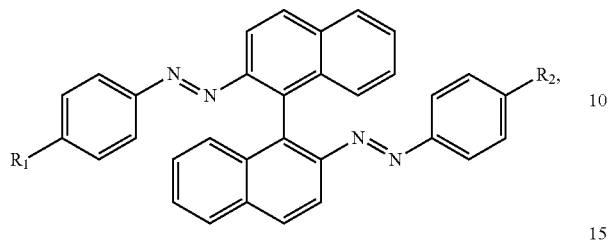

and wherein $R_1$ and $R_2$ are $CH_3$—$(CH_2)_4$—O, at least one photo-inactive chiral dopant, and at least one emissive dye; and contacting the first composition with a liquid polymer matrix solution to form an emulsion.

30. The method of claim 28, further comprising:
applying the emulsion to a substrate thereby forming a wet film; and
drying the wet film.

31. The method of claim 29, wherein forming the wet film comprises forming a film having a thickness of 30 μm to 150 μm.

* * * * *

UNITED STATES PATENT AND TRADEMARK OFFICE
CERTIFICATE OF CORRECTION

PATENT NO. : 10,203,536 B2  
APPLICATION NO. : 15/316429  
DATED : February 12, 2019  
INVENTOR(S) : Zheng Page 1 of 1

It is certified that error appears in the above-identified patent and that said Letters Patent is hereby corrected as shown below:

In the Claims

In Column 17, Line 36, please delete "1.11" and insert -- 1:11 -- therefor.

In Column 17, Lines 47-48, please delete "4-(dicyanomethylene) -2-methyl-6-(4-dimethylaminostyryl)-4H-pyran" and insert -- 4-(dicyanomethylene)-2-methyl-6-(4-dimethylaminostyryl)-4$H$-pyran -- therefor.

In Column 17, Lines 58-59, please delete "0.5 wt % to 2 wt %" and insert -- 0.5 wt% to 2 wt% -- therefor.

In Column 17, Lines 63-64, please delete "2.5 wt % to 15 wt %" and insert -- 2.5 wt% to 15 wt% -- therefor.

In Column 18, Line 3, please delete "15 wt %" and insert -- 15 wt% -- therefor.

In Column 18, Line 63, please delete "4H-pryan" and insert -- 4$H$-pyran -- therefor.

In Column 19, Line 22, please delete "28" and insert -- 29 -- therefor.

In Column 19, Line 26, please delete "29" and insert -- 30 -- therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*